US00RE35203E

United States Patent [19]

Wakalopulos

[11] E Patent Number: Re. 35,203

[45] Reissued Date of Patent: Apr. 9, 1996

[54] ELECTRON BEAM ARRAY FOR SURFACE TREATMENT

[75] Inventor: George Wakalopulos, Pacific Palisades, Calif.

[73] Assignee: American International Technologies, Inc., Torrance, Calif.

[21] Appl. No.: 497,807

[22] Filed: Jul. 3, 1995

Related U.S. Patent Documents

Reissue of:

[64] Patent No.: 5,414,267
Issued: May 9, 1995
Appl. No.: 68,052
Filed: May 26, 1993

[51] Int. Cl.[6] ..... H01J 37/30

[52] U.S. Cl. ..... 250/492.3; 250/400

[58] Field of Search ..... 250/492.3, 400

[56] References Cited

U.S. PATENT DOCUMENTS

| | | | |
|---|---|---|---|
| 3,440,466 | 4/1969 | Colvin et al. | 313/35 |
| 3,617,740 | 11/1971 | Skillicorn | 250/49.5 |
| 3,746,909 | 7/1973 | Runtzel et al. | 315/13 R |
| 4,020,354 | 4/1977 | Fauss et al. | 250/492 B |
| 4,246,297 | 1/1981 | Nablo et al. | 427/44 |
| 4,468,282 | 8/1984 | Neukermans | 156/633 |
| 4,499,405 | 2/1985 | Loda | 315/13.1 |
| 4,910,435 | 3/1990 | Wakalopulos | 315/111.31 |
| 4,957,835 | 9/1990 | Aden | 430/5 |
| 5,093,602 | 3/1992 | Kelly | 313/231.01 |
| 5,416,440 | 5/1995 | Lyons et al. | 250/492.3 |

*Primary Examiner*—Bruce C. Anderson
*Attorney, Agent, or Firm*—Schneck & McHugh

[57] ABSTRACT

An array of electron beam tubes is mounted on a conductive plate for projecting strip-like electron beams through air onto a substrate beneath the plate. The tubes each have a narrow beam window formed by a very thin low-Z film layer, supported by silicon and sealing the tube against ambient pressure. Such windows produce low beam attenuation and allow low extraction voltages to be used, thereby reducing beam energy which would otherwise be lost by penetration through a surface to be treated. The stripe-like output electron beam segments may be formed into a linear beam track so that the entire widthwise extent of a surface, such as a sheet or web, may be treated by electron beam irradiation or the beam segments may be formed into any desired composite beam pattern. In another embodiment the stripe-like output beam segments may be arranged in an array to treat a circular circumferential surface, such as a cable.

25 Claims, 5 Drawing Sheets

ELECTRON BEAM ARRAY FOR SURFACE TREATMENT

Matter enclosed in heavy brackets [ ] appears in the original patent but forms no part of this reissue specification; matter printed in italics indicates the additions made by reissue.

TECHNICAL FIELD

The invention relates to an arrangement of electron beam tubes having stripe-like beam patterns and, in particular, such an arrangement which forms a linear electron beam pattern for treatment of a surface.

BACKGROUND ART

At present, electron beam tubes for treating and processing surfaces typically use 15 micron thick titanium foil as the electron beam window. This requires a minimum operating voltage of 150 kilovolts in order to just penetrate the foil thickness. Typical voltages of at least 175 kilovolts are thus used to allow for the additional energy to process the substrate material.

The consequences of running at these voltage levels (175 Kev) to cure thin coatings, i.e. less than 10 microns, is inefficient and a great energy waste due to the fact that most of the electron energy passes right through the coating to be cured. Such equipment is large and costly primarily due to the x-ray shielding requirements produced by the high energy electrons.

An electron beam tube for surface treatment which avoids high voltages is a remote ion source type. Such a tube generates a stripe-like electron beam which impinges on a surface in a stripe pattern. The beam may be used for surface treatment of materials, such as curing of adhesives, and radiation chemistry in general. An example of this type of beam tube is found in U.S. Pat. No. 4,910,435 to G. Wakalopulos, assigned to the assignee of the present invention. Also disclosed is a long electron beam source, shown in FIG. 5 of the '435 patent, wherein a plurality of offset ion sources produce a plasma cloud at the center of a long chamber. The long plasma cloud generates a long electron beam. The present invention is concerned with this type of electron beam tube wherein a stripe-like beam is generated.

In U.S. Pat. No. 4,468,282 A. P. Neukermans discloses a device resembling a cathode ray tube, but having a face with a narrow window made of a thin silicon carbide or silicon nitride film layer. The pencil-like beam emitted through the window is used in a printing application. Neukermans showed that tough thin film windows can be advantageously used in scanning beam tubes.

An object of the invention was to provide surface treatment with wide electron beams, especially for polymer crosslinking applications, with minimum energy loss at the tube window.

SUMMARY OF THE INVENTION

The above object has been met with an array of thin low-Z film window electron beam tubes mounted on a support plate. Unlike scanning type beam tubes, each beam tube generates a stripe-like electron beam which spans part of the width of material being treated at a relatively low beam voltage, i.e. as low as 15–30 kV. The remainder of the width is treated with stripe-like beams from other tubes, the arrangement of tubes having beams spanning the entire width of material. Thin tube windows, being films or membranes strong enough to withstand atmospheric pressure, allow lower power consumption and more efficient energy coupling.

With thin low-Z windows, such as carbide or nitride windows, almost 50 times less incident power is used to cure a thin coating on a substrate. Another advantage is the much lower voltage necessary which eliminates the requirement for lead shielding and thus makes the system much less costly. Low-Z materials, i.e. atomic number less than 20, scatter much fewer electrons than high-Z materials. Beam attenuation is consequently less.

Since the thin film membranes are preferably products of the semiconductor industry which deals in discrete parts processing, the window sizes practically available will be several millimeters wide, 1 to 4 inches long and only a few microns thick. This means that in order to get large beam widths for wide web processing, a staggered array is used where tubes of constant diameter are stacked in offset geometries in order to attain wide beam spans as the substrate moves relative to the array. Such a substrate may carry a substance to be cured, such as hot melt adhesive.

A present day problem with electron beam curing is the necessity of making the beam environment inert in order to eliminate oxygen inhibition of surface cure. The beam tubes of the present invention can deliver sufficient energy for curing with low voltage electron beams delivered through thin window membranes. This reduces the requirement for inert environments and makes electron beam treatment through air much more cost competitive with ultraviolet light. Preliminary tests indicate that polymerization, crosslinking, and scission differ in low voltage exposure to that of high voltage irradiation. Early tests show a favorable trend towards polymerization at lower electron energies produced by beam tubes of the present invention.

A tube to be used for the above purpose has a vacuum tube envelope with a base end through which electrodes are fed and a window end which is spaced oppositely from the base end. A thin, electron beam permeable, carbide or nitride film, gas impermeable window is disposed in the window end. The thin window is made using semiconductor thin film fabrication techniques. A silicon wafer is used as a substrate and a thin low pressure chemical vapor deposition (LPCVD) film or membrane of low-Z material, such as carbide or nitride or doped silicon, is deposited on the substrate as a layer and then a small portion of the silicon wafer is etched away leaving the thin carbide or nitride layer supported by the silicon wafer everywhere except where a window has been etched. A doped silicon membrane, such as boron doped silicon could also be used. In this manner, the wafer serves as a support for the film layer. The layer adheres to the silicon tenaciously so that a pressure difference of at least an atmosphere between the inside and the outside of the tube may be withstood. The wafer is trimmed so that only the window portion is used.

An extended filament disposed near the base of the tube provides a source of thermionic electrons. An electron acceleration electrode in the form of a conductive frame surrounding the window has a high positive voltage relative to a beam forming electrode which removes electrons from the vicinity of the filament and propels them toward the thin window after forming and shaping a beam which corresponds in dimensions to the window. The beam forming electrode has a parabolic cylindrical shape, with the cylindrical axis parallel to the length of the extended filament. This electrode is negatively charged relative to the acceleration electrode, forcing electrons to form a cloud near the cylindrical axis from where they are extracted by the acceleration electrode.

A plurality of similar tubes may be mounted with window ends of the tubes supported on a conductive plate in offset or staggered positions. Apertures in the plate correspond to windows of the tubes. The plate makes contact with a conductive rim of each window so that the plate can function as the beam acceleration electrode for each tube at a positive potential. Elongate, stripe-like beams are aligned such that the totality of beams from staggered tubes spans the width of material to be treated. Alternatively, the tubes may be arranged in the array so that the stripe-like beams form nodular beam segments of any desired beam pattern. Such material to be treated is moved beneath the array of beams, either on a table or on rollers. The stripe-like beams traverse an air atmosphere onto the surface of material to be treated. The material is moved beneath the beams in a direction so that the beams are transverse to the direction of motion of the material. The support plate for the tubes may accommodate a desired number of tubes so that a material of specified width may be treated by the addition or removal of tubes from the support structure. Although the beam tubes described herein are preferred for providing modular beam segments for a desired beam pattern, other types of tubes which generate stripe-like beam patterns and having thin, electron beam permeable, carbide or nitride film windows may be used, such as remote ion source tubes.

BEST MODE FOR CARRYING OUT THE INVENTION

Figure 1:
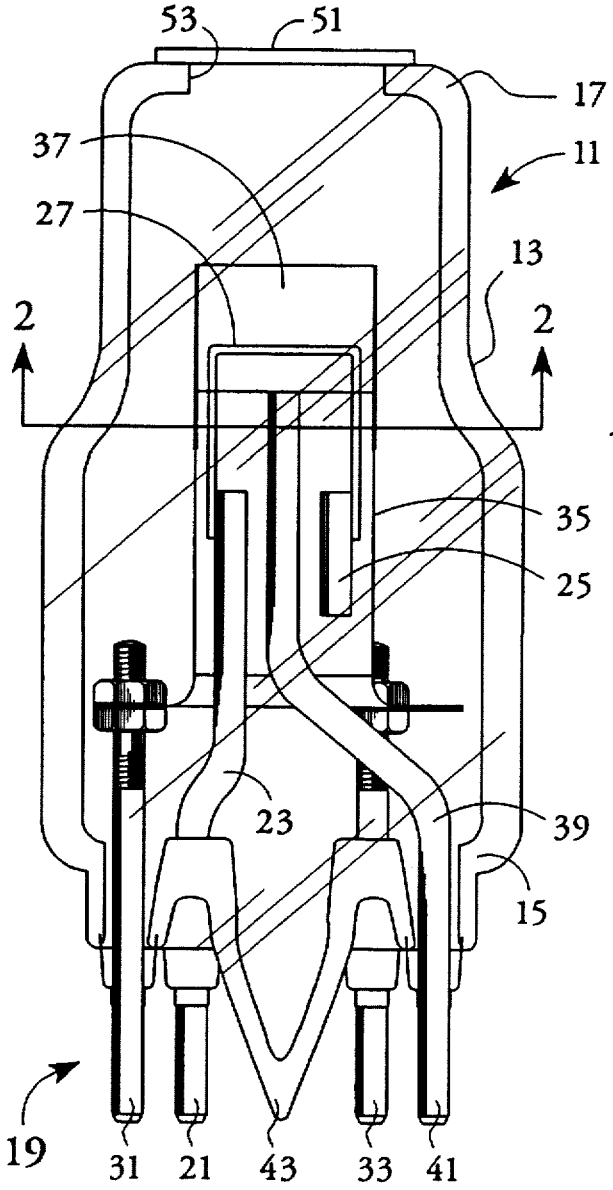
FIG. 1 is a cross-sectional view of a compact electron beam tube in accord with the present invention.

With reference to FIG. 1 the electron beam tube 11 is shown having a vacuum tube envelope 13, which may be glass or ceramic, with a base end 15 and a window end 17, spaced apart and opposite from the base end.

The entire tube is cylindrical, but the base end 15 has a larger circumference than the window end by approximately thirty percent. The larger circumference of the base end accommodates tube pins 19. A first pin 21 and a second hidden pin are connected to the tube envelope by means of a metal-to-glass seal or feed-through carrying the electrodes 23, 25 into the center of the tube. These electrodes are supported from a respective tube ends and provide mechanical support and electrical contact to a central extended filament 27. This filament is a thermionic electron emitter operating as a relatively low voltage, such as 24 volts.

Tube pins 31, 33 provide mechanical support of an insulative sleeve 35 which provides support for an electron beam forming electrode 37. A negative voltage relative to the filament of approximately minus 50–80 kV is carried on a wire 39 running through the center of the tube to the electron beam forming electrode 37. Voltages as low as 15–30 kV may be used with very thin windows. The upper limit of desirable voltage is about 120 kV. This beam forming electrode has the function of directing electrons from the extended filament 27 into an elongated central region of the electrode, by repulsion from the electrode walls. The beam forming electrode is a parabolic cylinder so that a long stripe-like electron beam, parallel to the filament, is formed. The wire 39 is seen to be connected to a tube end 41 after exiting the tube envelope by means of a feed-through. The tube envelope is maintained in a vacuum after being pumped down and sealed off by means of a glass seal 43. The tube can be pumped down to a pressure of $10^{-4}$ Torr prior to sealing. Optionally, the tube may have an off-on control grid, not shown, for switching the beam off and on. Although a thermionic filament tube has been shown, an indirectly heated cathode tube could also be used.

Opposite the extended filament is a tube window 51, made of a thin low-Z layer which is electron beam permeable, but impermeable to gas. In other words, window 51 maintains a gas-tight seal, keeping the outside atmosphere from penetrating the interior of the tube. The window is seated atop an opening 53 in the tube envelope. Alternatively, the window could be mounted from the inside of the tube envelope. A rectangular conductive frame is joined to the window allowing a positive voltage relative to the beam forming electrode to extract the electron beam from the tube. This voltage, which is ground potential, a high positive potential relative to the beam forming electrode, accelerates electrons from the beam forming electrode toward the window.

The conductive support frame connected to the periphery of the window carries ground voltage to boundary of window 51 providing an electric field through the window which attracts electrons from beam forming electrode 37. Local ground potential is supplied by a mounting plate, discussed below, or from any convenient source. The tube envelope 13 is glass or other dielectric, allowing penetration of the electric field from the boundary of window 51 into the vicinity of electrode 37. The ground voltage is about 50,000 volts positive relative to the beam forming electrode, thereby establishing an electric field between the interior of the beam forming electrode and the window. Since the window is electron permeable, electrons from electrode 37 are projected through the window. The conductive frame draws little current because substantially all electrons pass through the window. The entire length of the tube is about 15 cm. excluding pins outside of the tube. The largest circumferential dimension is about 8 cm.

One of the advantages of the above tube design over prior electron beam curing equipment is the relatively low beam voltage. A 50 kV beam has little penetrating power through polymers. Most of the beam energy is used in polymers for crosslinking and curing of the polymer. Beam energies below 80 kV are preferred for good curing efficiency.

Figure 2:
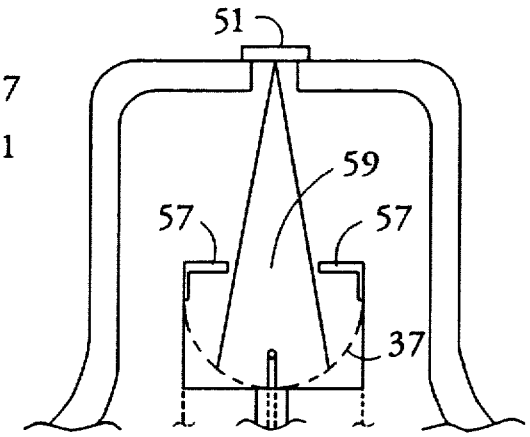
FIG. 2 is a cutaway orthogonal view of the electron beam tube of FIG. 1 taken along lines 2—2.

With reference to FIG. 2, the beam forming electrode 37 is seen to have a parabolic shape. However, the parabola is elongated parallel to extended filament 27, so that the solid body of electrode 37 is a cylindrical parabola. A pair of baffles 57 close a portion of the top of the electrode, but an elongated slit 59 exists, allowing egress of a stripe-like beam which is accelerated toward the window 51. The electron beam which is accelerated toward the window 51 is elongated in shape, parallel to extended filament 27. The electrons, in a stripe pattern, are drawn to the high voltage coating on the window and strike the window with sufficient energy to pass through the window, without attenuation.

Figure 3:
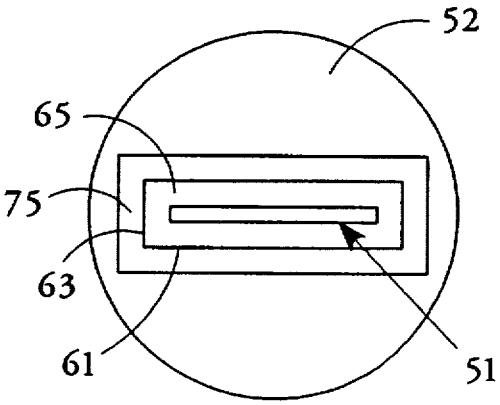
FIG. 3 is a top view of the electron beam tube of FIG. 1.

With reference to FIG. 3, the top face 52 of the tube is seen mounting window 51. In one direction the window has an elongated dimension 61 while at right angles there is a narrower widthwise dimension 63. The elongated dimension of the window is aligned with the corresponding dimension of the beam. The window consists of a support portion 65 mounted atop an opening in the end of the tube, surrounded by a conductive frame 75. The thin window 51 is in the central portion of the support 65 and has dimensions of several millimeters wide by 1 to 8 inches in length. More practical lengths will be 1–3 inches, which is better suited for mass production. The thickness of the thin window is in the range of 3 microns to 7 microns. Support 65 is made of silicon as described below. Metal and ceramic supports are also feasible.

Figure 4A:
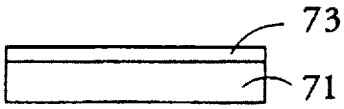
FIG. 4a and 4b are plan views of a method for making the thin windows for the electron beam tube of FIG. 1.

With reference to FIG. 4a construction of the thin window may be seen. A silicon wafer 71 has a very thin silicon or nitride coating applied by low pressure chemical vapor deposition. Fabrication of a thin film electron window is described in an article entitle "Electron Window Cathode Ray Tube Applications" by L. Hanlon et al. in J. Vacuum Science Technology Bulletin, 4(1), Jan/Feb. 1986. In that article, coatings of silicon carbide, boron nitride and boron carbide are described. However, the windows contemplated in the present invention are much smaller in the lengthwise direction than the CRT windows described in the article. The boundary of the window is mounted in a conductive frame 75, seen in FIG. 3, which may be an aluminum plate to be used in mounting the tubes on a support plate so that a thin window faces in a desired direction. Frame 75 is maintained at ground potential which is nominally zero volts. This is a relatively high voltage compared to the beam forming electrode 37 and so electrons are accelerated toward the window and projected through it. Windows may also be made by doping a silicon wafer with a moderate amount of boron, then etching as above, leaving a boron doped silicon membrane, with a thickness less than 20 microns.

Figure 4B:
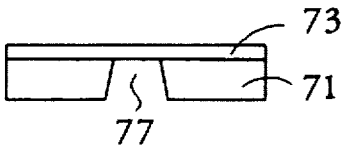

FIG. 4a shows the construction of the thin window where a carbide or a nitride layer 73 is chemically vapor deposited on a silicon wafer 71 to a thickness of between 3 to 20 microns. Windows of boron nitride, silicon carbide, silicon nitride, boron carbide, and boron nitride hydride are preferred. Besides the method described herein, films may be made by evaporation, etching and cathodic arc vapor deposition. In FIG. 4b the silicon wafer 71 is etched with a groove 77. Through this groove, the electron beam passes and penetrates window 73 in the zone immediately adjacent to groove 77. Support 65 in FIG. 3 corresponds to a cut portion of wafer 71 with dimensions corresponding to the outer dimensions of the window. Other types of tubes, such as remote ion source tubes, having similar windows, may be used.

Figure 5:
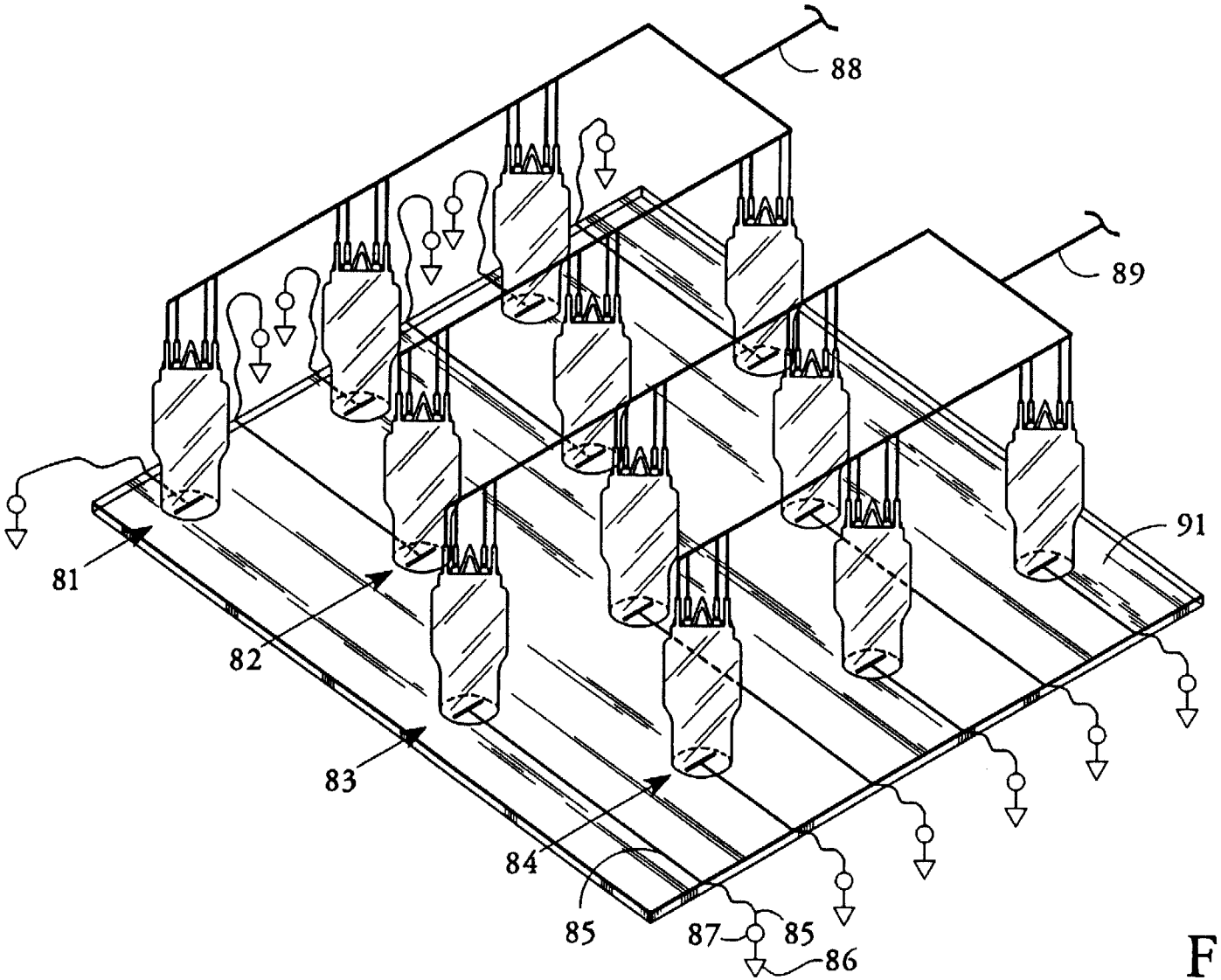
FIG. 5 is a perspective view of a tube array with multiple voltage leads mounted on a support plate in accord with the present invention.

With reference to FIG. 5, a plurality of electron beam tubes in rows 81–84 are shown mounted to a support plate 91 in an array of 4 columns of 3 tubes per column. Neighboring columns are offset by one-half the distance between adjacent tubes in a column. Support plate 91 is an insulative circuit board wherein each beam tube is electrically insulated from every other tube and is supported by the plate. A conductive trace 85 extends to each frame surrounding the thin window of each tube. By means of this trace, ground potential 86 is applied to the vicinity of the thin window of each tube. As mentioned above, the ground potential is a high voltage relative to the beam forming electrode of each tube. A current monitor 87, such as an ammeter, measures the amount of current drawn from ground to the tube. By measuring current levels, one can test the operability of each tube in an array. If no current or a very low current is being drawn by a tube in comparison to other tubes, this is an indication that the tube is not functioning properly and the entire array should be shut down until the defective tube is replaced. A single defective tube will impair the beam pattern unless redundant tubes are provided in an array. For large arrays a redundant row and column could provide a substitute tube for a defective one, without shutting down the array.

An array of tubes may be divided into a plurality of sections. FIG. 5 shows the array divided into a first section consisting of rows 81 and 82 and the second section consisting of rows 83 and 84. The beam forming electrode of rows 81 and 82 has a first voltage applied through cable 88, say 30 kV. The second section has a higher negative voltage, say 60 kV applied by cable 89. Cables 88 and 89 carry appropriate voltages for all tube pins, not only the high voltage electrodes. The first high voltage, 30 kV, being a lower voltage, will affect primarily the surface of the material being treated. The second high voltage, 60 kV, being a higher voltage, will also affect the surface, but with a greater amount of penetrating power, will also affect a greater depth of material. By applying a plurality of penetrating powers, a treatment gradient may be formed, with greater treatment being at the surface and lesser treatment below the surface. It is considered important to have the greatest amount of treatment at upper levels of the surface in applications such as curing of hot melt adhesives.

The beams are projected through apertures in the plate, corresponding in size to each window. The beams are staggered so as to sweep a continuous track across the substrate as the substrate moves under the beam tubes. The track is a continuous swathe which will sweep the substrate as the substrate moves relative to the tube array as illustrated in FIGS. 6 and 7.

Figure 5A:
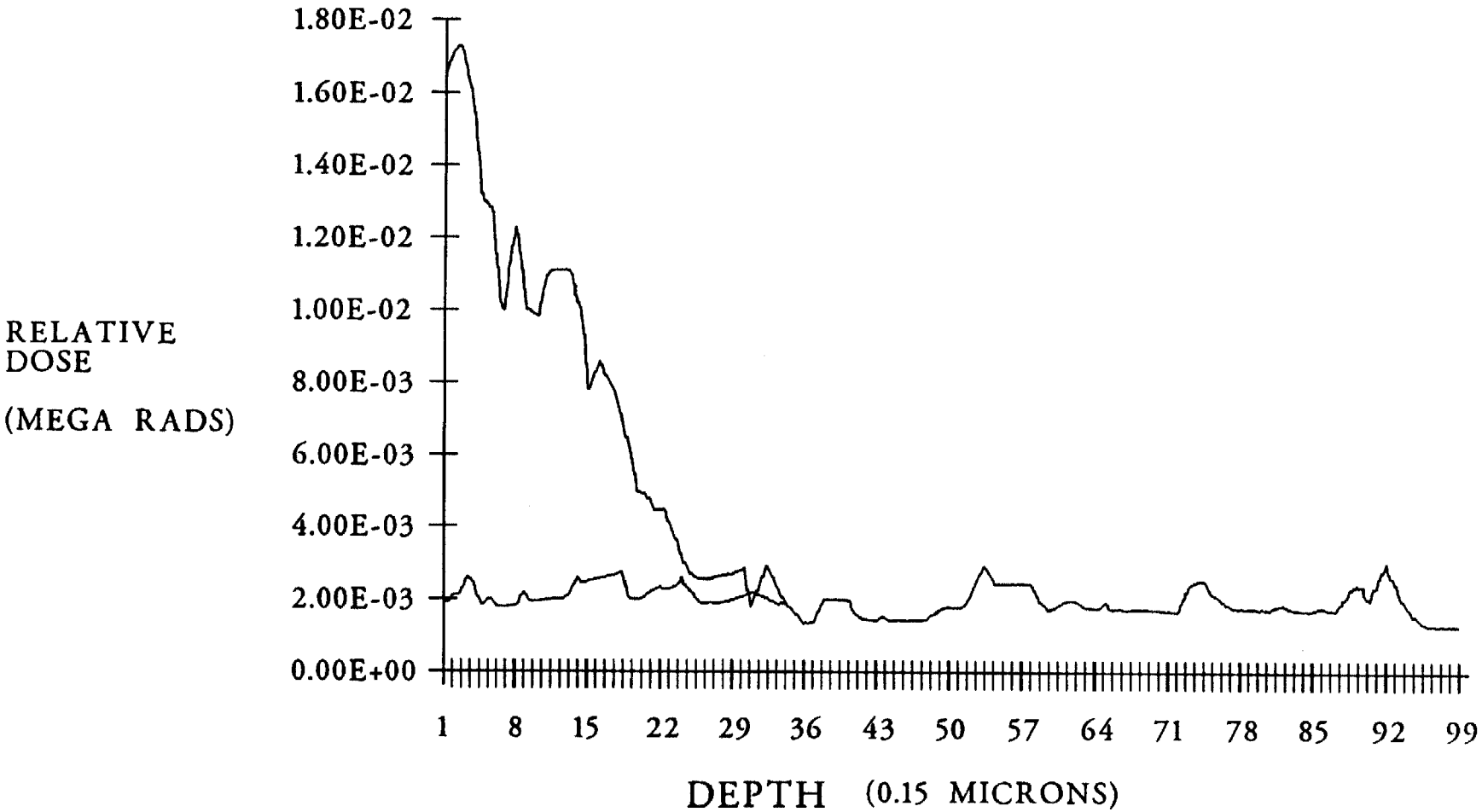
FIG. 5a is a graph showing dose versus depth for a dual voltage tube array of the type shown in FIG. 5.

With reference to FIG. 5a, the plot shows the penetration of a lower voltage beam, about 30 kV, in plot 80 and the penetration of a high voltage beam, about 60 kV, in plot 82. The two plots are summed to compute total dose in a material. The low voltage beam has a significant contribution at near zero depth and a rapidly diminishing contribution at just a few microns below the surface.

Figure 6:
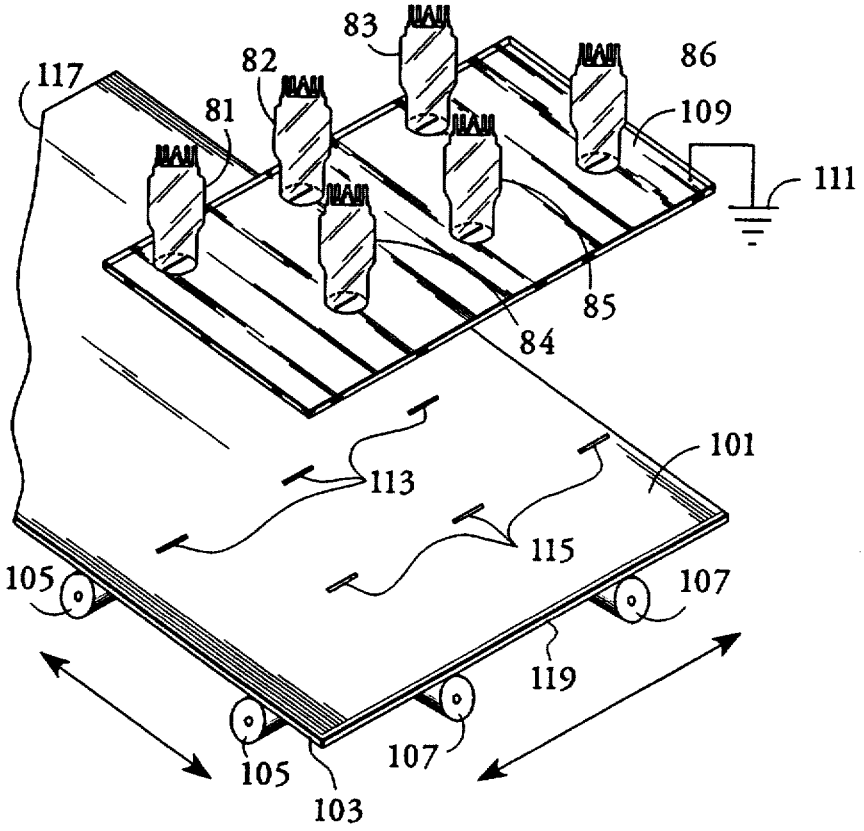
FIGS. 6 and 7 are plan views of the tube arrays with movable material stages.

In FIG. 6, the substrate 101 is mounted on a table 103 which may move by means of rollers 105 and 107 in the X and Y directions respectively. The beam tubes may be seen to be mounted face down on support plate 109 which is electrically grounded in order that the thin windows at the window end of each tube are at a high positive potential relative to the beam forming electrode. The substrate 101 may be seen to have beam exposure regions 113 and 115. These beam traces, if they were in a straight line, would span the width of substrate 101 in a single track. However, because the beam tubes from which these traces emanate are in two rows, the beam traces appear to be segmented stripes which are offset from each other by a distance equal to the lateral separation of the beam tubes. Since the substrate 101 is movable by means of rollers 105, the entirety of the substrate may be treated with an electron beam having the width of a track established by beam segments 113 and 115. The treatment area is a swathe extending from one edge 117 of the substrate to the opposite end 119. The width of the swathe is equal to the length of the track established by segments 113 and 115. As shown in FIG. 6, the entire length and width of the substrate 101 could be treated with an electron beam exposure.

Figure 7:
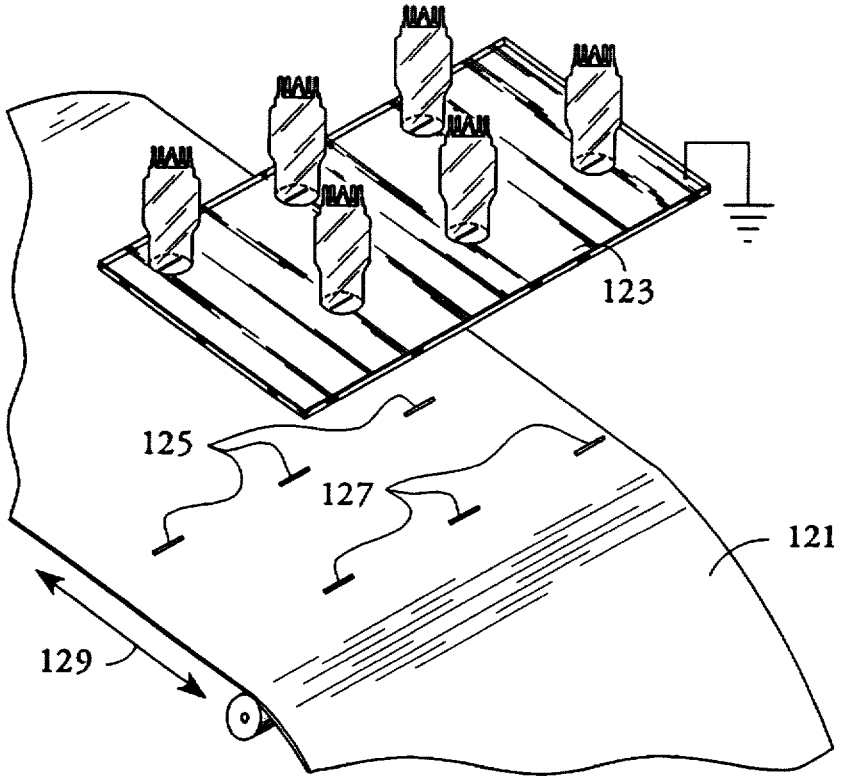

With reference to FIG. 7, a web 121 is shown passing beneath a plate 123 having a plurality of electron beam tubes mounted thereon, similar to those shown on plate 109 in FIG. 6. These electron beam tubes, similar to the beam tubes of FIG. 1, generate offset linear beam segments, 125 and 127. These beam segments resemble offset stripes which, if placed in a single line would be a track extending across the width of the web 121. In other words, the beam segments or stripes, if considered in a single track, would span the width of web 121 and allow the entire width of the web to be irradiated with an electron beam. As the web is advanced in the direction of arrows 129, from a takeup roll to a supply roll, not shown, the entire length of the web which passes under plate 123 may be irradiated by an electron beam. Several milliamperes beam current per linear inch are required for adequate curing. Such irradiation may be directed to a coating of hot melt which is applied to the web. Hot melt may be applied by a spray applicator, not shown, immediately prior to irradiation by the electron beam.

Figure 8:
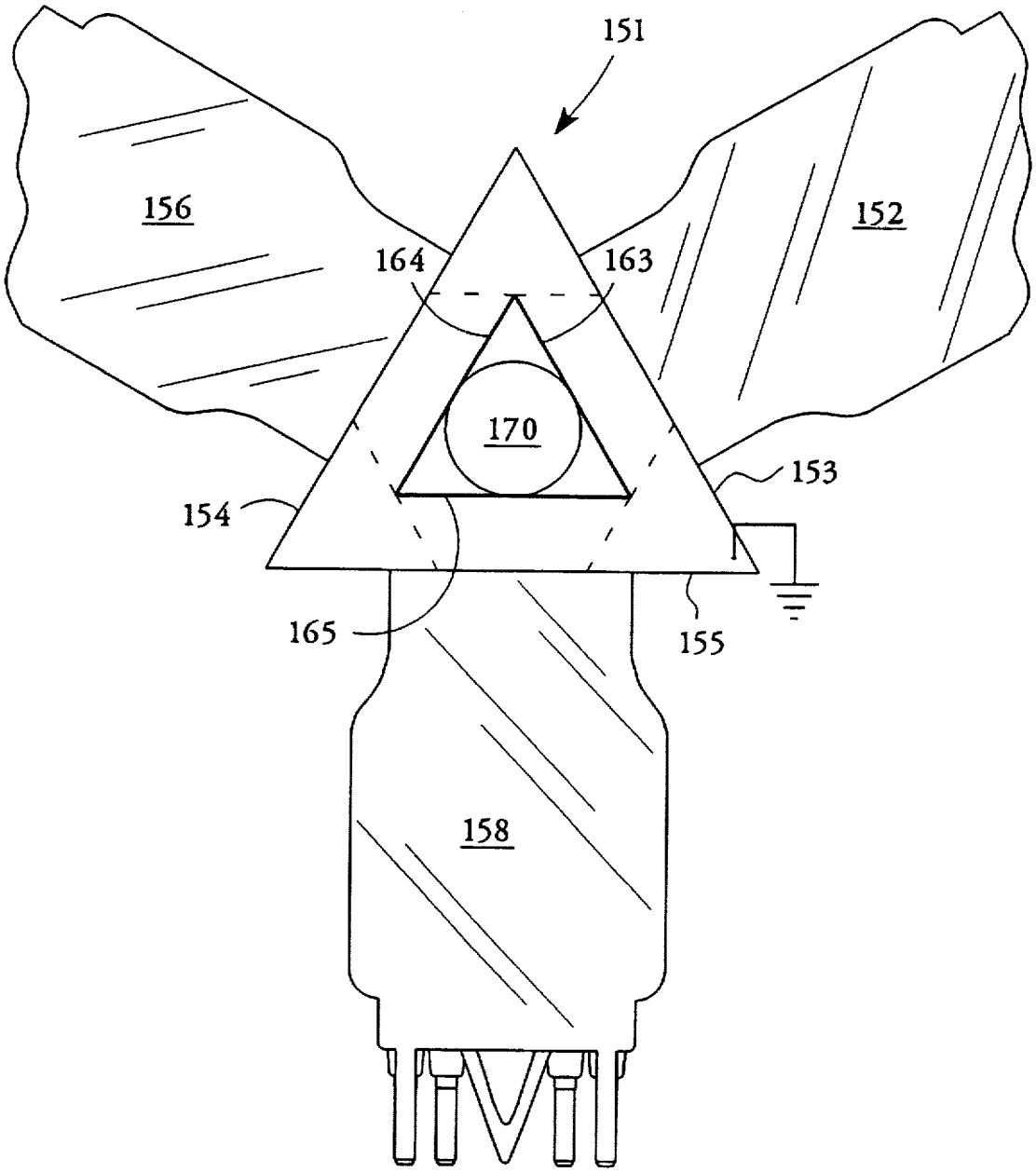
FIG. 8 is a plan view of a triangular array for treating linear material, such as cable or wire.

With reference to FIG. 8 a triangular support plate 151 is shown to have sides 153, 154 and 155. These sides mount three electron beam tubes 152, 156 and 158. These tubes are the same type as described with reference to FIG. 1. The array of tubes emit strip-like electron beams 163, 164 and 165 which circumscribe the circumference of a cable 170 having a generally circular circumference, which is the surface being treated. As the cable is advanced, its surface is subject to electron beam irradiation from the array of beam tubes. The dashed lines in the drawing indicate an exaggerated beam divergence from the tubes which are spaced apart, in air, from the cable surface to be treated. The beams are seen to form a triangle tangent with the surface of the cable. Other shapes which are extruded or linear in character may be similarly treated.

I claim:

1. An electron beam generating apparatus comprising, a support plate mounting a plurality of electron beam tubes in an array, each tube emitting a stripe-like electron beam through an electron beam permeable, low-Z, gas impermeable window, the tubes arranged in the array so that the stripe-like electron beams form modular beam segments of a desired beam pattern directed away from the support plate into an air atmosphere and onto a surface to be treated.

2. The apparatus of claim 1 wherein said window comprises a silicon membrane.

3. The apparatus of claim 1 wherein the electron beam tube comprises, a vacuum tube envelope having a base end and a window end longitudinally spaced apart from the base end, the window end having [a thin, electron beam permeable, carbide or nitride film, gas impermeable, window therein] *said electron beam permeable, gas impermeable window therein, said window being thin, carbide or nitride film and* having a specified major dimension across the window end of the tube envelope, an extended filament transversely disposed within the tube envelope proximate to the base end and generating electrons, and a beam forming electrode means disposed proximate to the extended filament for shaping an extended, stripe-like shape electron beam from said electrons wherein the extended shape of the electron beam is oriented parallel to the major dimension of the window, and a beam acceleration electrode means proximate to said film for projecting said electron beam through said window as a linear stripe-like beam, the beam having an energy less that 125 kV.

4. The electron beam generating apparatus of claim 3 wherein the [electron acceleration] *beam forming* electrode *means* has a cylindrical parabolic shape.

5. The electron beam generating apparatus of claim 3 wherein the extended filament is an elongated linear filament.

6. The electron beam generating apparatus of claim 3 wherein the electron beam permeable window has an elongated linear shape.

7. The electron beam generating apparatus of claim 3 wherein the electron beam permeable, gas impermeable window is a thin layer of silicon carbide.

8. The electron beam generating apparatus of claim 3 wherein the electron beam permeable, gas impermeable window is a thin layer of silicon nitride or boron nitride or doped silicon.

9. The electron beam generating apparatus of claim 3 wherein the [elongate] *extended, stripe-like shape electron* beam has an extent of at least one centimeter.

10. The electron beam generating apparatus of claim 1 wherein said support plate is planar.

11. An electron beam generating apparatus comprising, a support plate mounting a plurality of electron beam tubes in an array, each tube emitting a stripe-like electron beam through an electron beam permeable, low-Z, gas impermeable window, the tubes arranged in the array so that the stripe-like electron beams form modular beam segments of a desired beam pattern directed away from the support plate into an air atmosphere and onto a surface to be treated, and means for measuring the output of each tube.

12. An electron beam generating apparatus comprising, a support plate mounting a plurality of electron beam tubes in an array, each tube emitting a stripe-like electron beam through an electron beam permeable, low-Z gas impermeable window, the tubes arranged in the array so that the stripe-like electron beams form modular beam segments of a desired beam pattern directed away from the support plate into an air atmosphere and onto a surface to be treated, wherein beam tubes of said arrays are grouped in different sections having different output beam energy in each section.

13. An electron beam generating apparatus comprising, a support plate mounting a plurality of electron beam tubes in an array, each tube emitting a stripe-like electron beam through an electron beam permeable, low-Z, gas impermeable window, the tubes arranged in the array so that the stripe-like electron beams form modular beam segments of a desired beam pattern directed away from the support plate into an air atmosphere and onto a surface to be treated wherein the electron beam tube includes, a vacuum tube envelope having a base end and a window end spaced apart from the base end, the window end having a thin, electron beam permeable, carbide or nitride film, gas impermeable, window therein having a specified length across the window end of the tube envelope, an extended filament disposed within the tube envelope proximate to the base generating electrons, and a beam forming electrode means disposed proximate to the extended filament for shaping an extended, stripe-like shape electron beam from said electrons wherein the beam forming electrode has a forward baffle defining a beam aperture between the extended filament and the window and the extended shape of the electron beam is oriented parallel to the length of the window, and a beam acceleration electrode means proximate to said film for projecting said electron beam through said window as a linear stripe-like beam, the beam having an energy less than 125 kV.

14. An electron beam generating apparatus comprising, a support plate mounting a plurality of electron beam tubes in an arrays, each tube emitting a stripe-like electron beam through an electron beam permeable, low-Z, gas impermeable window, the tubes arranged in the array so that the stripe-like electron beams form modular beam segments of a desired beam pattern directed away from the support plate into an air atmosphere and onto a surface to be treated, wherein said support plate is triangular with beam tubes directing electron beams inside of the triangle defined by the support plate.

15. An electron beam generating apparatus comprising, a plurality of electron beam tubes, each tube having a window end spaced apart from a base end, the window end having a thin, elongated, electron permeable, low-Z, gas impermeable window penetrated by a stripe-like electron beam, a support means for holding the beam tubes in an array spaced such that the stripe-like electron beams from the plurality of tubes emerge from said windows and sweep the entirety of a linear track spaced apart in air from the window ends of the tubes, and a beam current monitor connected to each tube.

16. The electron beam generating apparatus of claim 15 wherein said support means comprises a planar or triangular plate means.

17. The electron beam generating apparatus of claim 15 further comprising a material handling table having a length and a width, spaced apart from said support plate, having means for advancing material past said plurality of electron beam tubes.

18. The electron beam generating apparatus of claim 17 wherein the means for advancing material operates in a direction wherein said track is parallel to the length of the table.

19. The electron beam generating apparatus of claim 17 wherein the means for advancing material operates in a direction wherein said track is parallel to the width of the table.

20. The electron beam generating apparatus of claim 15 further comprising spaced apart material handling rollers defining a plane having a specified width, the plane being spaced apart from said support plate, the rollers advancing material in a direction past said plurality of electron beam tubes such that said track is transverse to said direction.

21. The electron beam generating apparatus of claim 15 wherein the electron beam permeable, gas impermeable window is a thin layer of silicon nitride or boron nitride or doped silicon.

22. An electron beam generating apparatus comprising, a plurality of electron beam tubes, each tube having a stripe-like beam and a window end spaced apart from a base end, the window end having a thin electron beam permeable, low-Z, gas impermeable window therein having a specific length across the window end of the tube envelope accommodating the stripe-like beam, and a support means for holding the beam tubes in an array spaced such that the stripe-like electron beams from the plurality of tubes emerge from said windows and sweep the entirety of a linear track spaced apart in air from the window ends of the tubes, said support means including a plate means for contacting the window end of said tubes, said plate means carrying an electrical potential in insulated relation for each tube.

23. The electron beam generating apparatus of claim 22 wherein said plate means comprises an insulative sheet with conductive traces, at least one trace connected to each tube, wherein a voltage may be applied to each tube.

24. An electron beam generating apparatus comprising, a vacuum tube envelope having a base end and a window end spaced longitudinally apart from the base end, the window end having a thin, electron beam permeable, low-Z, gas impermeable window therein having a specified length across the window end of the tube envelope, an extended filament disposed transversely within the tube envelope proximate to the base end and generating electrons, and a beam forming electrode means disposed proximate to the extended filament for shaping an extended, stripe-like shape electron beam from said electrons wherein the extended shape of the electron beam is oriented parallel to the length of the window, and a beam acceleration electrode means proximate to said film for projecting said electron beam through said window as a linear stripe-like beam.

25. The electron beam generating apparatus of claim 24 wherein the electron beam permeable, gas impermeable window is a thin layer of silicon nitride or boron nitride or doped silicon.

* * * * *